US008773492B2

United States Patent
Kim et al.

(10) Patent No.: US 8,773,492 B2
(45) Date of Patent: Jul. 8, 2014

(54) VIDEO CALL TERMINAL, MOBILE PHONE AND CONTROL METHOD THEREOF

(75) Inventors: Min-jung Kim, Seoul (KR); Dong-wook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 13/096,611

(22) Filed: Apr. 28, 2011

(65) Prior Publication Data

US 2012/0092437 A1 Apr. 19, 2012

(30) Foreign Application Priority Data

Oct. 13, 2010 (KR) ........................ 10-2010-0099693

(51) Int. Cl.
*H04N 7/14* (2006.01)

(52) U.S. Cl.
USPC .................................... 348/14.02; 348/14.09

(58) Field of Classification Search
CPC ......... H04N 7/152; H04N 7/15; H04N 7/147; H04W 24/00; H04W 36/02; H04W 48/16; H04W 4/00; H04W 4/16; H04W 76/02
USPC ............ 370/260; 379/204; 455/415, 436, 442
See application file for complete search history.

(56) References Cited

U.S. PATENT DOCUMENTS

| 2002/0067405 A1* | 6/2002 | McDiarmid | 348/14.08 |
| 2005/0207355 A1* | 9/2005 | Du | 370/260 |
| 2006/0172766 A1* | 8/2006 | Kim et al. | 455/553.1 |
| 2006/0173766 A1* | 8/2006 | Suzuki et al. | 705/35 |

OTHER PUBLICATIONS

Search Report dated May 19, 2011 from the European Patent Office in counterpart European application No. 11160818.8.

* cited by examiner

*Primary Examiner* — Curtis Kuntz
*Assistant Examiner* — Sunita Joshi
(74) *Attorney, Agent, or Firm* — Sughrue Mion, PLLC

(57) ABSTRACT

A video call terminal, a mobile phone and a control method thereof are provided. The video call terminal includes a first communication unit configured to conduct a video call with a second terminal through an Internet protocol (IP) network; a second communication unit configured to communicate with a mobile phone; and a controller configured to transmit first network information of the video call terminal to the mobile phone, receive second network information of the second terminal from the mobile phone, and control the video call with the second terminal using at least one of the first and second network information.

32 Claims, 5 Drawing Sheets

VIDEO CALL TERMINAL, MOBILE PHONE AND CONTROL METHOD THEREOF

CROSS-REFERENCE TO RELATED APPLICATION

This application claims priority from Korean Patent Application No. 10-2010-0099693, filed on Oct. 13, 2010 in the Korean Intellectual Property Office, the disclosure of which is incorporated herein by reference.

BACKGROUND

1. Field

Apparatuses and methods consistent with the exemplary embodiments relate to a video call terminal, a mobile phone and a control method thereof, in which mutual communication is possible for an effective video call.

2. Description of the Related Art

A video call using a related art mobile phone is not supported between second generation (2G) type mobile phones and between a 2G type mobile phone and a third generation (3G) type mobile phone. Although video calls are supported between two 3G type mobile phones, it has not been widely used as compared with voice calls because video calls have disadvantages such as the mobile phone has to be kept elevated, its screen size is relatively small, and the call charge is more expensive than that of a voice call.

Meanwhile, in the case of a voice call using a Voice over Internet Protocol (VoIP) type video call terminal such as a VoIP monitor, a user has to know network information for connecting with the other party terminal and do his/her own setup related to a network. Thus, use of the voice call is limited since it is complicated and inconvenient. Also, in the case of a monitor type video call terminal, voice and video are input and output through an opened microphone, loudspeaker, camera, display, etc., and therefore the monitor type video call terminal is improper for a private call or a security-required video call.

SUMMARY

Therefore, according to an aspect of one or more exemplary embodiments, there is provided a video call terminal, a mobile phone and a control method thereof, which can make a video call more conveniently and inexpensively.

Another aspect of one or more exemplary embodiments is to provide a video call terminal, a mobile phone and a control method thereof, which can allow unspecified individuals having no network information to make a video call.

Still another an aspect of one or more exemplary embodiments is to provide a video call terminal, a mobile phone and a control method thereof, which can make a video call while protecting privacy and maintaining security.

The foregoing and/or other aspects may be achieved by providing a video call terminal including: a voice input unit through which a voice for a video call is input; a video input unit through which a video for the video call is input; a first communication unit which performs communication for the video call with the other party terminal through an Internet protocol (IP) network; a voice output unit which outputs a voice of the other party terminal for the video call; a video output unit which outputs a video of the other party terminal for the video call; a second communication unit which performs local communication with a mobile phone; and a controller which transmits network information of the video call terminal to the mobile phone as requested by the mobile phone, receives network information of the other party terminal from the mobile phone, and controls the video call with the other party terminal to be implemented on the basis of the received network information.

The controller may control the voice output unit and/or the video output unit not to output at least one of a voice and video of the other party terminal.

The video call terminal may further include a command receiver to receive a user's command, wherein the controller determines whether to output a voice and video of the other party terminal on the basis of the user's command.

The controller may control at least one of a voice and video from the mobile phone to be received and transmitted to the other party terminal.

The controller may control at least one of a voice and video of the other party terminal to be transmitted to the mobile phone.

The video call terminal may further include a storage unit which stores a record of the video call, wherein the controller deletes the record of the video call with the other party terminal from the storage unit.

Another aspect may be achieved by providing a control method of a video call terminal, the control method including: transmitting network information of the video call terminal to a mobile phone as requested by the mobile phone by implementing local communication with a mobile phone; receiving network information of the other party terminal from the mobile phone; and implementing communication for a video call with the other party through an Internet protocol (IP) network on the basis of the received network information of the other party terminal.

The control method may further include outputting at least one of a voice and video of the other party terminal.

The control method may further include inputting a user's command, wherein the outputting includes outputting the at least one of the voice and video of the other party terminal on the basis of the user's command.

The control method may further include receiving at least one of a voice and video from the mobile phone; and transmitting the received at least one of the voice and the video to the other party terminal.

The control method may further include transmitting the at least one of a voice and video of the other party terminal to the mobile phone.

The control method may further include storing a record of the video call; and deleting the record of the video call with the other party terminal.

Still another aspect may be achieved by providing a mobile phone including: a voice input unit through which a voice for a call with the other party phone is input; a first communication unit which performs communication for the call with the other party phone through a mobile network; a voice output unit which outputs a voice of the other party phone; a second communication unit which performs local communication with a video call terminal for a video call; and a controller which receives network information of the video call terminal from the video call terminal, receives network information of the other party terminal for the video call with the video call terminal from the mobile phone, and controls the received network information to be transmitted to the video call terminal.

The controller may control the call with the other phone to be terminated.

The controller may receive a voice of the video call of the other party terminal from the video call terminal, and control the voice output unit to output the received voice of the video call.

The mobile phone may further include a video output unit, wherein the controller receives a video of the video call of the other party terminal from the video call terminal, and controls the video output unit to output the received video of the video call.

The controller may transmit a voice input through the voice input unit to the video call terminal.

The mobile phone may further include a video input unit through which a video is input, wherein the controller transmits an image input through the video input unit to the video call terminal.

Yet another aspect may be achieved by providing a control method of a mobile phone, the control method including: implementing communication for a call with the other party phone through a mobile network; receiving network information of a video call terminal from the video call terminal by performing local communication with the video call terminal for a video call; transmitting the received network information of the video call terminal to the other party phone; receiving network information of the other party terminal for the video call with the video call terminal from the other party phone; and transmitting the received network information of the other party terminal to the video call terminal.

The control method may further include terminating the call with the other phone.

The control method may further include receiving a voice of the video call of the other party terminal from the video call terminal; and outputting the received voice of the video call.

The control method may further include receiving a video of the video call of the other party terminal from the video call terminal; and outputting the received video of the video call.

The control method may further include inputting at least one of a video and voice for the video call; and transmitting the input at least one of the video and voice to the video call terminal.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
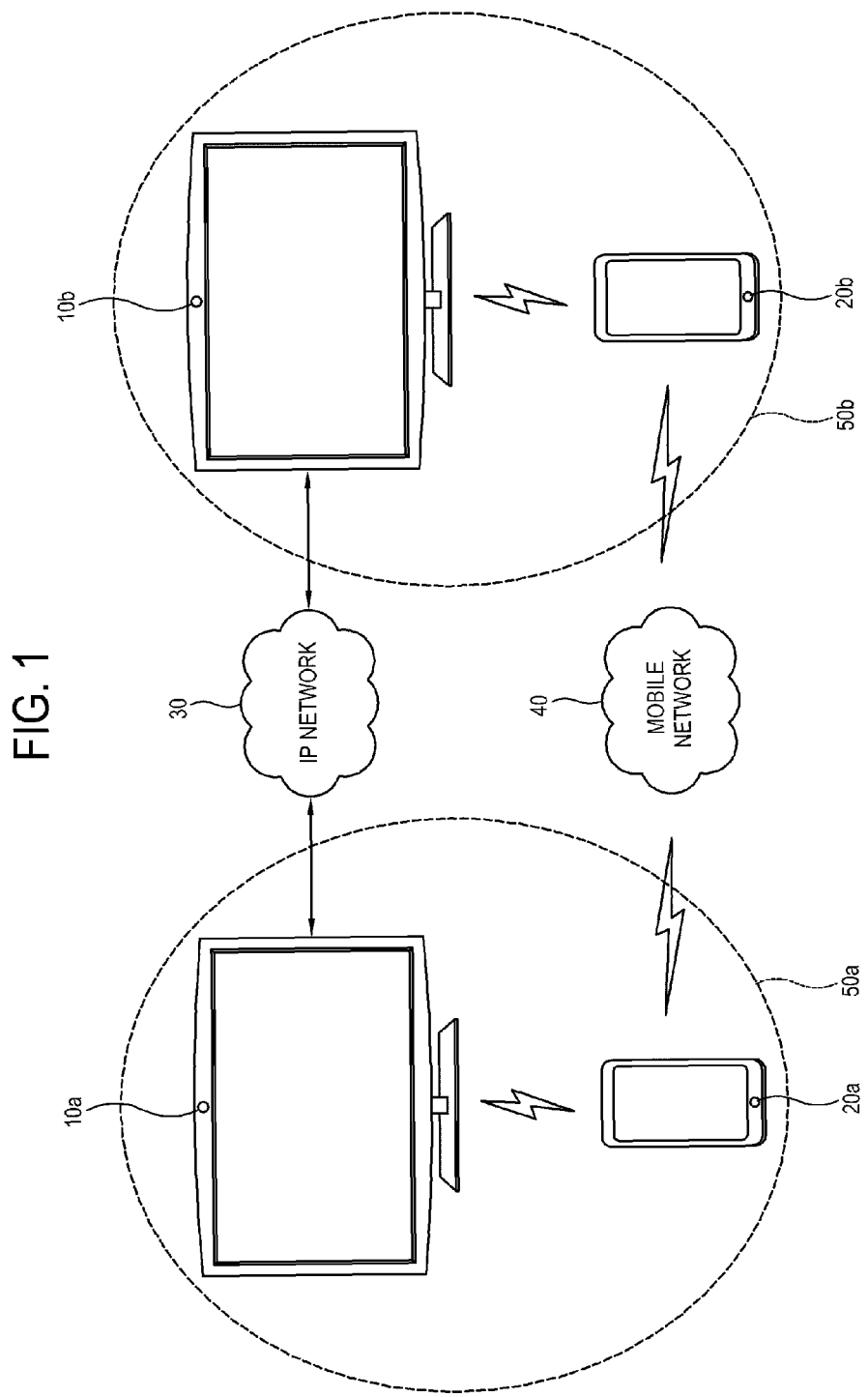
FIG. 1 shows a pair of video call terminals and a pair of mobile phones according to an exemplary embodiment.

Below, exemplary embodiments will be described in detail with reference to accompanying drawings. FIG. 1 shows a pair of video call terminals 10a and 10b and a pair of mobile phones 20a and 20b according to an exemplary embodiment. The pair of video call terminals 10a and 10b performs mutual communication for a video call via an internet protocol (IP) network 30. There is no limit to a communication method performed by the pair of video call terminals 10a and 10b, and the communication method includes a Voice over Internet Protocol (VoIP) method. For convenience, the video call terminal call 10b will be referred to below as "the other party terminal" 10b for distinction from the video call terminal 10a. Regarding the other party terminal 10b, repetitive descriptions about the configurations equal or similar to the video call terminal 10a will be avoided as necessary.

The pair of mobile phones 20a and 20b performs mutual communication for a voice call via a mobile network 40. There is no limit to a communication performed by the pair of mobile phones 20a and 20b, the communication method includes 2G, 2.5G, 3G and 4G. For convenience, the mobile phone 20b will be referred to below as "the other party phone 20b" for distinction from the mobile phone 20a. Regarding the other party phone 20b, repetitive descriptions about the configurations equal to or similar with the mobile phone 20a will be avoided as necessary.

The video call terminal 10a and the mobile phone 20a are within a local area 50a where one user can use both of them. Likewise, the other party terminal 10b and the other party phone 20b are within a local area 50b. The video call terminal 10a and the mobile phone 20a can perform mutual communication within the local area 50a. There is no limit to the communication method performed by the video call terminal 10a and the mobile phone 20a, and the communication method includes Bluetooth, Wi-Fi, etc.

Figure 2:
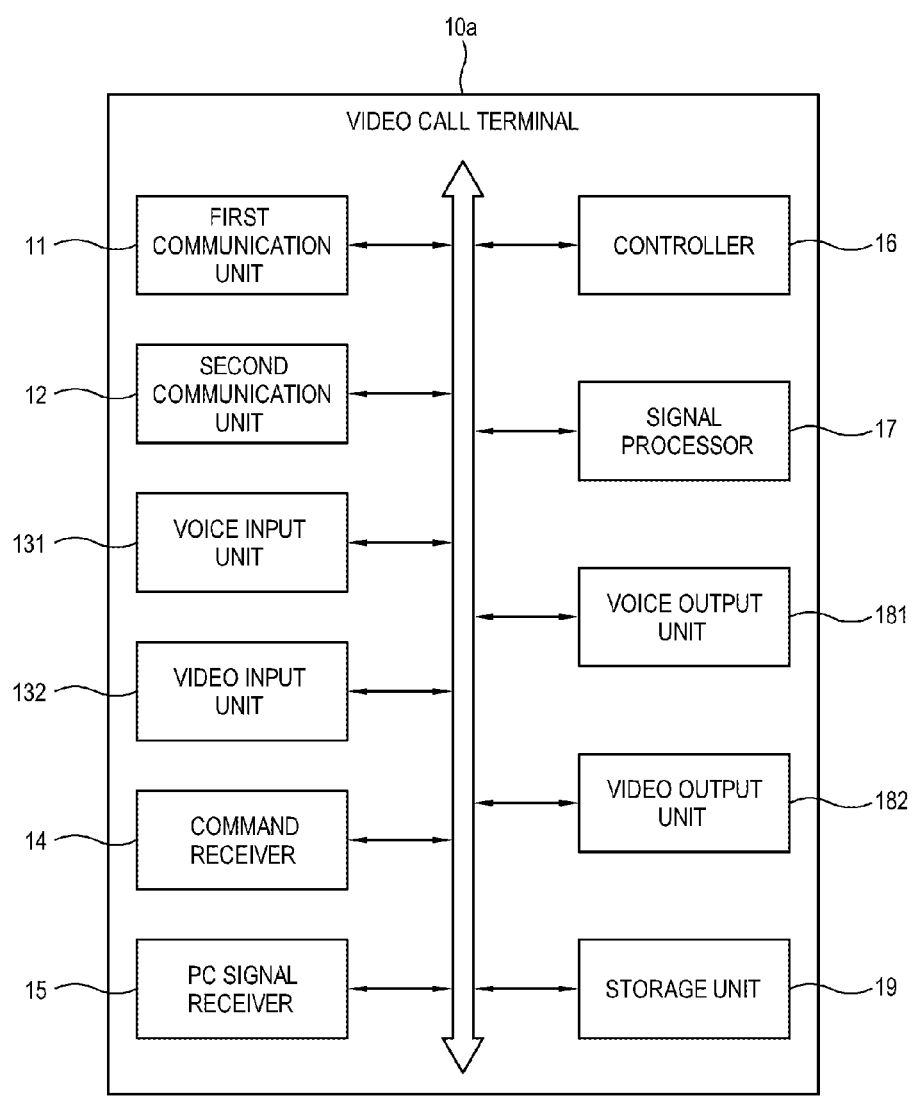
FIG. 2 is a block diagram illustrating a configuration of the video call terminal shown in FIG. 1.

FIG. 2 is a block diagram illustrating a configuration of the video call terminal 10a shown in FIG. 1. As an example of the video call terminal 10a shown in FIG. 2, there is a VoIP monitor. Referring to FIG. 2, the video call terminal 10a includes a first communication unit 11, a second communication unit 12, a voice input unit 131, a video input unit 132, a command receiver 14, a personal computer (PC) signal receiver 15, a signal processor 17, a voice output unit 181, a video output unit 182, a storage unit 19, and a controller 16.

The term "unit," as used herein, means, but is not limited to, a software or hardware component, such as a Field Programmable Gate Array (FPGA) or an Application Specific Integrated Circuit (ASIC), which performs certain tasks. A unit may advantageously be configured to reside in the addressable storage medium and to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented so as to execute one or more Central Processing Units (CPUs) in a device.

The first communication unit 11 performs communication for a video call with the other party terminal 10b via the IP network 30. The voice input unit 131 receives a voice signal for the video call with the other party terminal 10b. The voice input unit 131 may include a microphone. The video input unit 132 receives a video signal for the video call with the other party terminal 10b. The video input unit 132 may include a camera. The voice output unit 181 outputs a voice signal for the video call with the other party terminal 10b. The voice output unit 181 may include a loudspeaker. The video output unit 182 outputs a video signal for the video call with the other party terminal 10b. The video output unit 182 may include a display such as a liquid crystal display (LCD), etc. The signal processor 17 processes the voice and video signals which are input or output through the first communication unit 11, the voice input unit 131, the video input unit 132, the voice output unit 181 and the video output unit 182 for the purpose of the video call with the other party terminal 10b. The second communication unit 12 performs local communication with the mobile phone 20a, and transmits and receives data or information for the video call with the other party terminal 10b to or from the mobile phone 20a. The command receiver 14 receives a user's command. The command receiver 14 includes a remote control signal receiver and receives a remote control signal corresponding to a user's command from a remote controller (not shown). The command receiver 14 may further include a keypad corresponding to a user's command. The storage unit 19 stores data needed for operating the video call terminal 10a therein. The PC signal receiver 15 receives a signal from a PC so that the video call terminal 10a can serve as a monitor for the PC. A signal received from the PC through the PC signal receiver 15 may be processed by the signal processor 17 and output through the voice output unit 181 and/or the video output unit 182. The controller 16 generally controls the above elements for the purpose of the video call with the other party terminal 10b (refer to FIGS. 4 and 5).

Figure 3:
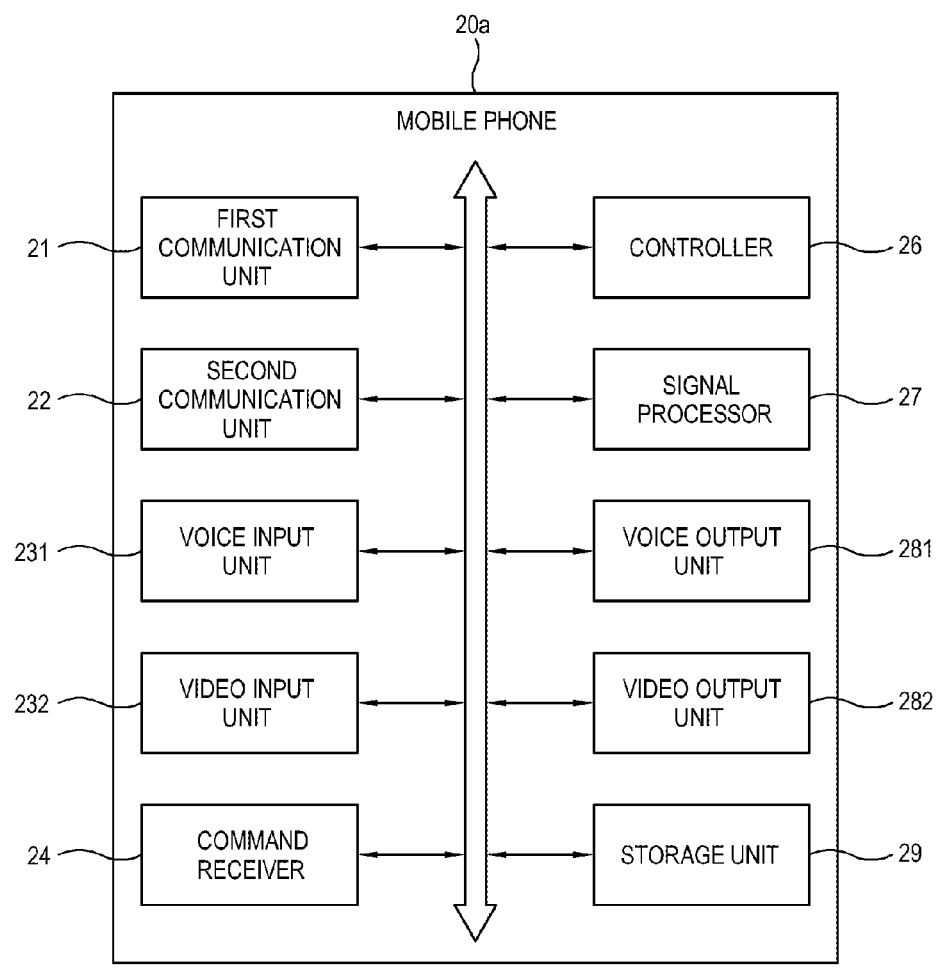
FIG. 3 is a block diagram illustrating a configuration of the mobile phone shown in FIG. 1.

FIG. 3 is a block diagram illustrating a configuration of the mobile phone 20a shown in FIG. 1. Referring to FIG. 3, the mobile phone 20a includes a first communication unit 21, a second communication unit 22, a voice input unit 231, a command receiver 24, a signal processor 27, a voice output unit 281, a storage unit 29, and a controller 26.

The first communication unit 11 performs communication for a voice call with the other party phone 20b via the mobile network 40. The voice input unit 231 receives a voice for the voice call with the other party phone 20b. The voice input unit 231 may include a microphone. The voice output unit 281 outputs a voice for the video call with the other party phone 20b. The voice output unit 281 may include a loudspeaker. The signal processor 27 processes signals of the voice and video which are input or output through the first communication unit 21, the voice input unit 231 and the voice output unit 281 for the purpose of the voice call with the other party phone 20b. The second communication unit 22 performs local communication with the video call terminal 10a, and transmits and receives data or information for the video call with the other party terminal 10b to or from the video call terminal 10. The command receiver 24 includes a keypad, a touchpad, etc. and receives a user's command. The storage unit 29 stores data needed for operating the mobile phone 20a therein. The controller 26 generally controls the above elements for the purpose of the voice call with the other party phone 20b and the video call with the other party terminal 10b (refer to FIGS. 4 and 5).

According to an alternative exemplary embodiment, the voice input unit 231 may further receive a voice for the video call with the other party terminal 10b. The voice input for the video call is transmitted to the video call terminal 10a via the second communication unit 22. The voice output unit 281 may further output the voice for the video call with the other party terminal 10b, transmitted from the video call terminal 10a via the second communication unit 22. Also, the mobile phone 20a may further include a video input unit 232 such as a camera, and receive the video for the video call with the other party terminal 10b. The video input for the video call is transmitted to the video call terminal 10a via the second communication unit 22. The mobile phone 20a may further include a video output unit 282 such as an LCD or the like, and the video output unit 282 may output a video for the video call with the other party terminal 10b, transmitted from the video call terminal 10a via the second communication unit 22.

Figure 4:
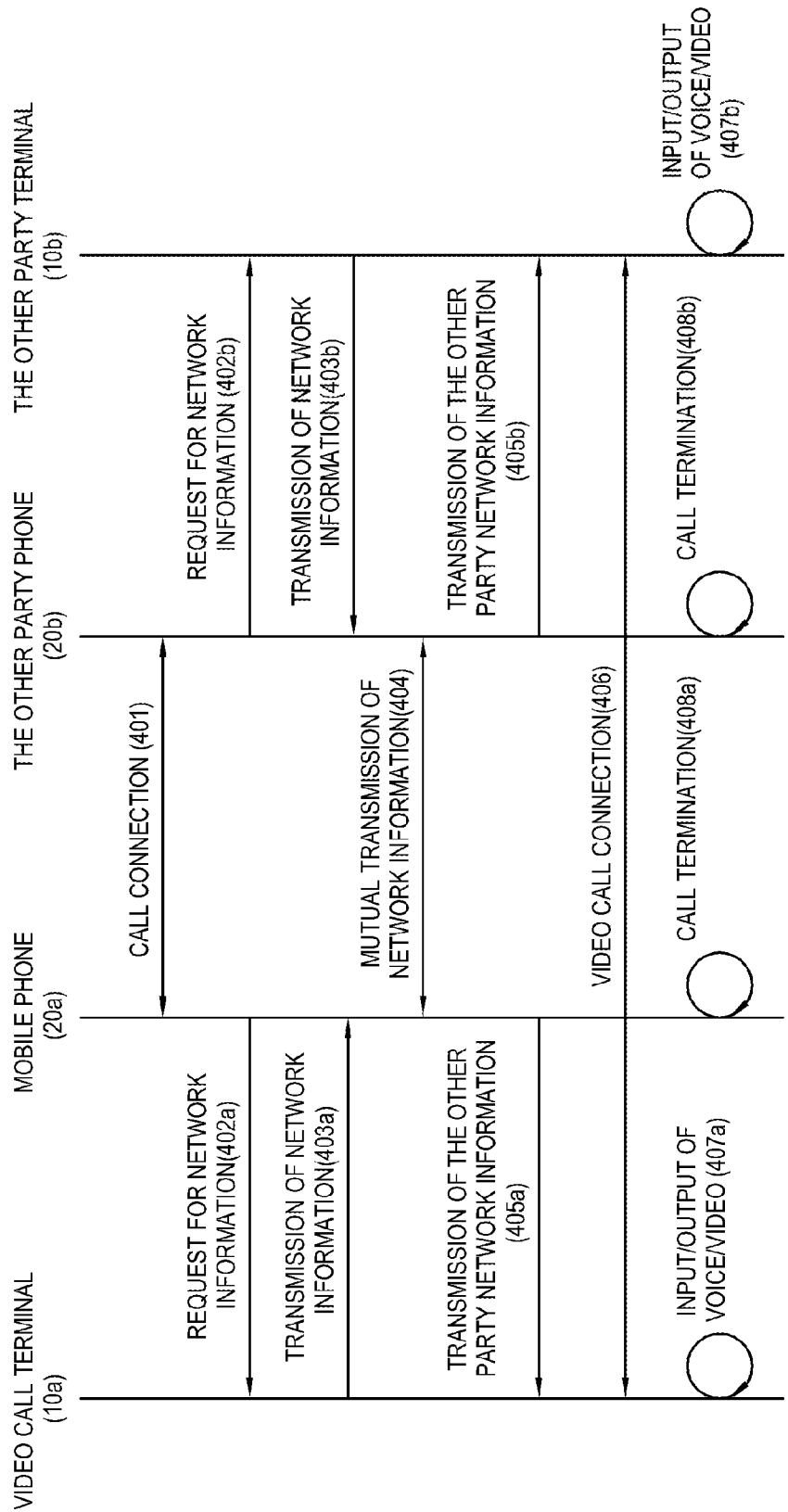
FIGS. 4 and 5 illustrate examples of operations in the video call terminal and the mobile phone shown in FIGS. 1 to 3.

FIG. 4 illustrates an example of operations in the video call terminal 10a, the other party terminal 10b, the mobile phone 20a, and the other party phone 20b of FIGS. 1 to 3. In FIG. 4, one user employs the mobile phone 20a and the video call terminal 10a for the vide call, and another user employs the other party phone 20b and the other party terminal 10b (hereinafter, referred to as "the other party" or "the other party user").

First, at operation 401, the mobile phone 20a tries a voice call with the other party phone 20b as requested by a user. Responding to this, the other party phone 20b is connected with the mobile phone 20a. In this state, a user and the other party can conduct a voice call through the mobile phone 20a and the other party phone 20b, respectively.

Then, at operation 402a, the mobile phone 20a searches any device capable of a video call in the vicinity thereof. As a result of searching, if the video call terminal 10a is detected, the mobile phone 20a makes a request to the video call terminal 10a to transmit its network information. In this exemplary embodiment, the network information includes an internet protocol (IP) address, a gateway address, router information, etc. of the video call terminal 10a. At operation 403a, the video call terminal 10a transmits its own network information to the mobile phone 20a, in response to the network information request. Similarly, at the operations 402b and 403b, the other party phone 20b also acquires the network information of the other party terminal 10b.

Next, at operation 404, the network information of the video call terminal 10a is transmitted from the mobile phone 20a to the other party phone 20b, and the network information of the other party terminal 10b is transmitted from the other party phone 20b to the mobile phone 20a. Then, at operation 405a, the mobile phone 20a transmits the network information of the other party terminal 10b, received from the other party phone 20b, to the video call terminal 10a. Likewise, at operation 405b, the other party phone 20b transmits the network information of the video call terminal 10a, received from the mobile phone 20a, to the other party terminal 10b.

Then, at operation 406, the video call terminal 10a and the other party terminal 10b are connected for the video call on the basis of the received network information. When the video call connection is achieved, at operation 407a the video call terminal 10a receives an input voice signal and video signal for the video call and transmits the input voice signal and video signal to the other party terminal 10b, thereby allowing the other party terminal 10b to output the transmitted voice and video signals. Simultaneously, at operation 407b, the other party terminal 10a receives an input voice signal and video signal for the video call and transmits the input voice signal and video signal to the voice call terminal 10a, thereby allowing the video call terminal 10a to output the transmitted voice and video signals. If the video call is implemented between the video call terminal 10a and the other party terminal 10b, the mobile phone 20a and the other party terminal 10b may terminate a voice call at operations 408a and 408b.

As described above, according to an exemplary embodiment, the video call is possible using the IP network such as the VoIP, so that it can be less expensive than using the mobile network. Also, network setup is automatically implemented for the video call between the video call terminal and the mobile phone, and therefore a user does not have to set up the network, thereby enhancing convenience and enabling unspecified individuals having no network information to make a video call.

Figure 5:
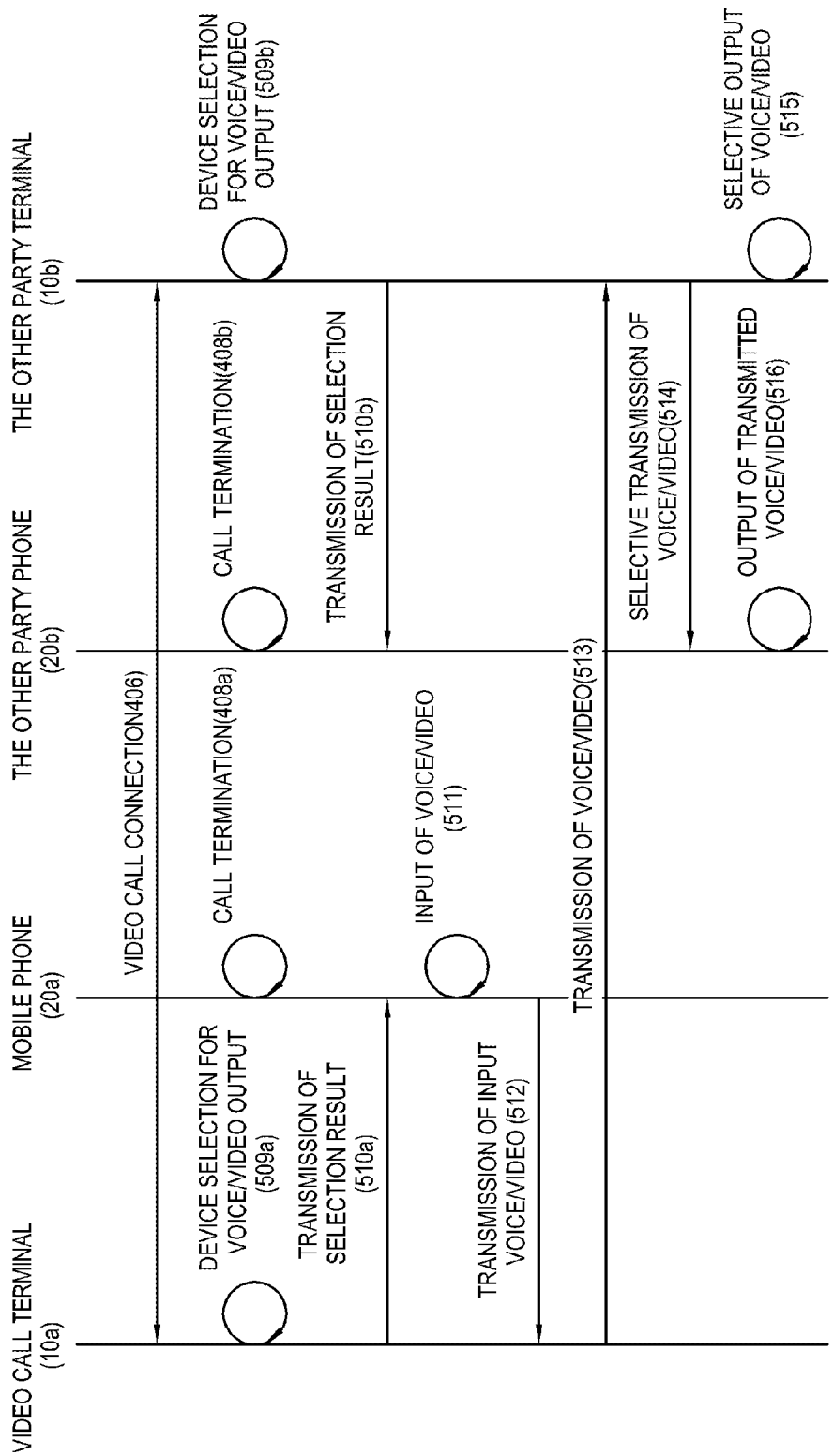

FIG. 5 illustrates another example of operations in the video call terminal 10a and the other party terminal 10b, and the mobile phone 20a and the other party phone 20b of FIGS. 1 to 3. In the exemplary embodiment of FIG. 5, repetitive illustration and descriptions about the configurations equal to or similar with that of FIG. 4 will be avoided as necessary. For example, the operations S401 to 405a and 405b are the same as those of FIG. 4, and thus they are not illustrated.

Referring to FIG. 5, at operation 406 if the video call terminal 10a and the other party terminal 10b are connected for a video call, at operations 509a and 509b the video call terminal 10a and the other party terminal 10b respectively determine which devices will be used for outputting a voice signal and video signal of the video call. Specifically, the video call terminal 10a and the other party terminal 10b respectively display menus for allowing users to select output devices for the voice and video signals of the video call, and thus determine the output devices in accordance with a user's selection. The output devices can be variously selected. For example, both the video and voice signals of the video call may be output through only the video call terminal 10a. Alternatively, the video signal of the video call may be output through the video call terminal 10a, and the voice signal of the video call may be output through the mobile phone 20a. Further, both the video and voice signals of the video call may be output through only the mobile phone 20a. If a user selects the output device, at operations 510a and 510b the video call terminal 10a and the other party terminal 10b may transmit the selection results to the mobile phone 20a and the other party phone 20b, respectively. Alternatively, the selection of the output device may be carried out in the mobile phone 20a and/or the other party phone 20b. In this case, the mobile phone 20a and/or the other party phone 20b may transmit the selection results of the output devices to the video call terminal 10a and/or the other party terminal 10b, respectively.

Then, at operation 511 the mobile phone 20a inputs the voice signal and/or video signal for the video call in accordance with the selection results of the output devices. At operation 512, the mobile phone 20a transmits the input voice signal and/or video signal for the video call to the video call terminal 10a. At operation 513, the video call terminal 10a sends the transmitted voice signal and/or video signal for the video call to the other party terminal 10b. At operation 514, the other party terminal 10b selectively sends the transmitted voice signal and/or video signal for the video call to the other party phone 20b in accordance with the other party's selection results of the output device. Also, at operation 515, the other party terminal 10b selectively outputs the transmitted voice signal and/or video signal for the video call in accordance with the selection results of the output device. Meanwhile, at operation 516, the other party phone 20b outputs the voice signal and/or video signal for the video call, transmitted from the other party terminal 10b.

For convenience, the exemplary embodiment shown in FIG. 5 illustrates only the case that the voice signal and/or video signal for the video call are input to the mobile phone 20a and transmitted to and output through the other party phone 20b, but the exemplary embodiment is not limited thereto and is capable of operating in the reverse direction. Also, the exemplary embodiment shown in FIG. 5 describes that both the video call terminal 10a and the other party terminal 10b selects the output devices, respectively, but the exemplary embodiment is not limited thereto. Alternatively, only one of the video call terminal 10a and the other party terminal 10b may select the output device.

As described above, according to an exemplary embodiment, the output of the voice signal and/or video signal for the video call is limited in an open video call terminal, but achieved in a private mobile phone. Accordingly, it is possible to protect privacy and maintain security.

Although it is not shown in FIGS. 4 and 5, the video call terminal 10a and the other party terminal 10b can store and maintain a record of the video call. In this case, the video call terminal 10a and the other party terminal 10b may delete the record of the corresponding video call if requested by a user. In light of deleting the record of the video call, the video call terminal 10a and the other party terminal 10b may display a menu related to the record deletion of the video call and delete the record of the video call in accordance with a command input by a user. Accordingly, the privacy protection and the security maintenance can be further improved.

Therefore, according to an exemplary embodiment, using only a video call terminal and a mobile phone, a video call is possible, and a private video call is also possible, all over the world beyond the limit of a local network. Also, unspecified individuals having no network information can make a video call. For example, anyone can readily make a video call, even while not in a place that uses a static IP address, like a home, but in a public place such as a café.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A video call terminal being a first video call terminal and comprising:
   a first communication unit configured to conduct a video call with a second video call terminal through an Internet protocol (IP) network;
   a second communication unit configured to communicate with a first mobile phone over a first local network; and
   a controller configured to transmit first network information of the first video call terminal to the first mobile phone over the first local network, receive, from the first mobile phone over the first local network, second network information of the second video call terminal having been received by the first mobile phone from a second mobile phone via a mobile network, and control the video call with the second video call terminal using at least one of the first and second network information,
   wherein the first mobile phone searches any device capable of a video call, and when the first video call terminal is detected from the search result, the first mobile phone makes a request to the first video call terminal to transmit the first network information.

2. The video call terminal according to claim 1, further comprising:
   a voice output unit configured to output a voice signal received from the second video call terminal; and
   a video output unit configured to output a video signal received from the second video call terminal.

3. The video call terminal according to claim 2, wherein the controller controls at least one of the voice output unit and the video output unit not to output at least one of the voice signal and the video signal received from the second video call terminal.

4. The video call terminal according to claim 3, further comprising a command receiver configured to receive a user's command,
   wherein the controller determines whether to output a voice signal and a video signal received from the second video call terminal on the basis of the user's command.

5. The video call terminal according to claim 3, wherein the controller controls at least one of a voice signal and a video signal received from the first mobile phone to be transmitted to the second video call terminal.

6. The video call terminal according to claim 1, wherein the controller controls at least one of a voice signal and a video signal received from the second video call terminal to be transmitted to the first mobile phone.

7. The video call terminal according to claim 1, further comprising a storage unit configured to store a record of the video call,
wherein the controller deletes the record of the video call from the storage unit.

8. The video call terminal according to claim 1, further comprising:
a voice input unit configured to receive a voice signal; and
a video input unit configured to receive a video signal.

9. The video call terminal according to claim 8,
wherein the controller controls the first communication unit to transmit at least one of the voice signal and the video signal to the second video call terminal over the IP network.

10. The video call terminal according to claim 1,
wherein the second mobile phone receives the second network information from the second video call terminal over a second local network.

11. A control method of a video call terminal being a first video call terminal, the control method comprising:
transmitting first network information of the first video call terminal to a first mobile phone over a local network;
receiving, from the mobile phone over the local network, second network information of a second video call terminal having been received by the first mobile phone from a second mobile phone via a mobile network; and
conducting a video call with the second video call terminal through an Internet protocol (IP) network on the basis of at least one of the first and second network information,
wherein the first mobile phone searches any device capable of a video call, and when the first video call terminal is detected from the search result, the first mobile phone makes a request to the first video call terminal to transmit the first network information.

12. The control method according to claim 11, further comprising outputting at least one of a voice signal and a video signal received from the second video call terminal.

13. The control method according to claim 12, further comprising receiving a user's command,
wherein the outputting comprises outputting the at least one of the voice signal and the video signal received from the second video call terminal according to the user's command.

14. The control method according to claim 12, further comprising receiving at least one of a voice signal and a video signal from the first mobile phone; and
transmitting the received at least one of the voice signal and the video signal to the second video call terminal over the IP network.

15. The control method according to claim 11, further comprising transmitting at least one of a voice signal and a video signal received from the second video call terminal to the first mobile phone over the local network.

16. The control method according to claim 11, further comprising
storing a record of the video call; and
deleting the record of the video call.

17. A mobile phone being a first mobile phone and comprising:
a first communication unit configured to communicate with a second mobile phone through a mobile network;
a second communication unit configured to communicate with a first video call terminal over a local network; and
a controller which receives first network information of the first video call terminal from the first video call terminal via a local network, receives second network information of a second video call terminal from a second mobile phone via a mobile network, and controls the second network information to be transmitted to the first video call terminal via the local network,
wherein the first mobile phone searches any device capable of a video call, and when the first video call terminal is detected from the search result, the first mobile phone makes a request to the first video call terminal to transmit the first network information.

18. The mobile phone according to claim 17, wherein, after the second network information is transmitted to the first video call terminal, the controller controls the call with the second mobile phone to be terminated.

19. The mobile phone according to claim 17, further comprising a voice output unit;
wherein the controller receives a voice signal of a video call transmitted by the second video call terminal from the first video call terminal, and controls the voice output unit to output the received voice signal of the video call.

20. The mobile phone according to claim 17, further comprising a video output unit,
wherein the controller receives a video signal of the video call of the second video call terminal from the first video call terminal, and controls the video output unit to output the received video signal of the video call.

21. The mobile phone according to claim 19, wherein the controller transmits a voice signal input through the voice input unit to the first video call terminal.

22. The mobile phone according to claim 20,
wherein the controller transmits a video signal input through the video input unit to the first video call terminal.

23. A control method of a mobile phone being a first mobile phone, the control method comprising:
establishing a call with a second mobile phone through a mobile network;
receiving first network information of a first video call terminal from the first video call terminal over a local network for establishing a video call;
transmitting the received first network information to the second mobile phone via a mobile network;
receiving second network information of a second video call terminal for the video call with the first video call terminal from the second mobile phone via the mobile network; and
transmitting the second network information of the second video call terminal to the first video call terminal,
wherein the first mobile phone searches any device capable of a video call, and when the first video call terminal is detected from the search result, the first mobile phone makes a request to the first video call terminal to transmit the first network information.

24. The control method according to claim 23, further comprising terminating the call with the second mobile phone.

25. The control method according to claim 24, further comprising
receiving a voice signal of the video call of the second video call terminal from the first video call terminal; and
outputting the received voice signal of the video call.

26. The control method according to claim 23, further comprising
receiving a video signal of the video call of the second video call terminal from the first video call terminal; and
outputting the received video signal of the video call.

27. The control method according to claim 23, further comprising
- receiving at least one of a video signal and a voice signal for the video call; and
- transmitting the received at least one of the video signal and voice signal to the first video call terminal.

28. A video call system, comprising:
- a first video call terminal;
- a first mobile phone configured to communicate with the first video call terminal over a first local network;
- a second video call terminal configured to communicate with the first video terminal over an Internet protocol (IP) network; and
- a second mobile phone configured to communicate with the second video terminal over a second local network, and configured to communicate with the first mobile phone over a mobile network;
- wherein the first video call terminal transmits first network information to the second video call terminal, the second video call terminal transmits second network information to the first video call terminal, and the first and second video call terminals conduct a video call using at least one of the first and second network information,
- wherein the first mobile phone searches any device capable of a video call, and when the first video call terminal is detected from the search result, the first mobile phone makes a request to the first video call terminal to transmit the first network information,
- wherein the first video call terminal transmits the first network information to the first mobile phone over the first local network, the first mobile phone transmits the first network information to the second mobile phone over the mobile network, and the second mobile phone transmits the first network information to the second video call terminal over the second local network.

29. The video call system of claim 28,
wherein the second video call terminal transmits the second network information to the second mobile phone over the second local network, the second mobile phone transmits the second network information to the first mobile phone over the mobile network, and the first mobile phone transmits the second network information to the first video call terminal over the first local network.

30. The video call system of claim 28,
wherein the first mobile phone and the second mobile phone establish a call connection over the mobile network;
wherein the first video call terminal and the second video call terminal establish a video call connection over the IP network using at least one the first and second network information; and
wherein, after the video call connection is established, the call connection is terminated.

31. The video call system of claim 28,
wherein the first video call terminal receives at least one of a video signal and a voice signal, and transmits the received at least one of the video signal and the voice signal to the second video call terminal over the IP network.

32. The video call system of claim 31,
wherein the first video call terminal receives the at least one of a video signal and a voice signal from the first mobile phone.

* * * * *